United States Patent
Clauberg et al.

(10) Patent No.: US 6,610,772 B1
(45) Date of Patent: *Aug. 26, 2003

(54) PLATELET PARTICLE POLYMER COMPOSITE WITH OXYGEN SCAVENGING ORGANIC CATIONS

(75) Inventors: Horst Clauberg, Kingsport, TN (US); Michael John Cyr, Kingsport, TN (US); Robert Boyd Barbee, Kingsport, TN (US); Tony Wayne Helton, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,518

(22) Filed: Aug. 2, 2000

Related U.S. Application Data

(60) Provisional application No. 60/148,156, filed on Aug. 10, 1999.

(51) Int. Cl.$^7$ .................................................. C08K 3/34
(52) U.S. Cl. ...................... 524/445; 524/186; 524/398; 524/413; 524/435; 524/431
(58) Field of Search .................................. 524/186, 398, 524/413, 431, 435, 445; 501/145, 146, 148; 523/210, 211

(56) References Cited

U.S. PATENT DOCUMENTS

| | | |
|---|---|---|
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | 11/1974 | Basel et al. |
| 3,876,552 A | 4/1975 | Moynihan |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al. |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaria et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kühner et al. |
| 4,450,095 A | 5/1984 | Finlayson |
| 4,472,538 A | 9/1984 | Kamigaito et al. |
| 4,482,695 A | 11/1984 | Barbee et al. |
| 4,517,112 A | 5/1985 | Mardis et al. |

(List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |

(List continued on next page.)

OTHER PUBLICATIONS

LeBaron et al., "Polymer–layered silicate nanocomposites: an overview," *App. Clay Sci.*, 15, 11–29 (1999).

Ke et al., "Crystallization, Properties, and Crystal and Nanoscale Morphology of PET–Clay Nanocomposites," *J. Appl. Polym. Sci.*, 71, 1139–1146 (1999).

Kawasumi et al., "Preparation and Mechanical Properties of Polypropylene–Clay Hybrids," *Macromolecules*, 30, 6333–6338 (1997).

(List continued on next page.)

*Primary Examiner*—Edward J. Cain
*Assistant Examiner*—Katarzyna Wyrozebski Lee
(74) *Attorney, Agent, or Firm*—Eric D. Middlemas; Bernard J. Graves, Jr.

(57) ABSTRACT

The present invention relates to oxygen scavenging compositions comprising a) platelet particles having attached thereto at least one oxygen scavenging organic cation and b) at least one oxidation catalyst. The oxygen scavenging compositions of the present invention maybe readily incorporated into a variety of matrix polymers to create polymer composites, which display improved passive barrier and oxygen scavenging capabilities. Articles formed from these composites are also disclosed.

22 Claims, No Drawings

U.S. PATENT DOCUMENTS

| | | |
|---|---|---|
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A | 9/1993 | Deguchi et al. |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Naé et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A | 1/1995 | Maxfield et al. ............ 428/297 |
| 5,414,042 A | 5/1995 | Yasue et al. |
| 5,429,999 A | 7/1995 | Naé et al. |
| 5,434,000 A | 7/1995 | Konagaya et al. |
| 5,514,734 A | 5/1996 | Maxfield et al. |
| 5,523,045 A | 6/1996 | Kudert et al. |
| 5,530,052 A | 6/1996 | Takekoshi et al. |
| 5,552,469 A | 9/1996 | Beall et al. |
| 5,578,672 A | 11/1996 | Beall et al. |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A | 5/1998 | Christiani et al. |
| 5,780,376 A | 7/1998 | Gonzales et al. |
| 5,807,630 A | 9/1998 | Christie et al. |
| 5,830,544 A | 11/1998 | Kerscher et al. |
| 5,849,830 A | 12/1998 | Tsipursky et al. |
| 5,882,751 A | 3/1999 | Occhiello et al. |
| 5,942,320 A | 8/1999 | Miyake et al. |
| 5,952,093 A | 9/1999 | Nichols et al. |
| 5,972,448 A | 10/1999 | Frisk et al. ................. 428/35.7 |
| 5,993,769 A | 11/1999 | Pinnavaia et al. |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,396 A | 5/2000 | Lan et al. |
| 6,060,549 A | 5/2000 | Li et al. |
| 6,071,988 A | 6/2000 | Barbee et al. |
| 6,084,019 A | 7/2000 | Matayabas, Jr. et al. |
| 6,117,541 A | 9/2000 | Frisk |
| 6,120,860 A | 9/2000 | Bowen et al. |
| 6,162,857 A | 12/2000 | Trexler et al. |
| 6,232,388 B1 | 5/2001 | Lan et al. |
| 6,254,803 B1 | 7/2001 | Matthews et al. ..... 252/188.28 |

FOREIGN PATENT DOCUMENTS

| | | |
|---|---|---|
| EP | 0691376 | 1/1996 |
| EP | 681990 | 11/1996 |
| EP | 747451 | 12/1996 |
| EP | 0761739 | 3/1997 |
| EP | 780340 | 6/1997 |
| EP | 0846723 | 6/1998 |
| EP | 0909787 | 4/1999 |
| EP | 0 909 787 A1 | 4/1999 |
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 76029697 | 3/1976 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | 0822163 | 2/1998 |
| WO | WO 98/29499 | 7/1998 |
| WO | WO 98/53000 | 11/1998 |
| WO | WO 99/02593 | 1/1999 |
| WO | W0 99/15432 | 4/1999 |
| WO | WO 99/38914 | 8/1999 |
| WO | WO 99/41299 | 8/1999 |
| WO | WO 0034378 | 6/2000 |
| WO | WO 0034393 | 6/2000 |

OTHER PUBLICATIONS

Usuki et al., "Synthesis of Propylene–Clay Hybrid", *J. Appl. Polym. Sci.*, 63, 137–139 (1997).

Giannelis, "Polymer Layered Silicate Nanocomposites," *Advanced Materials, 8,* 29–35 (1996).

Kurokawa et al., "Preparation of a nanocomposite of polypropylene and smectite", *J. Materials Science Letters, 15,* 1481–1483 (1996).

Oriakhi et al., "Incorporation of poly (acrylic acid), poly (vinylsulfonate) and poly (styrenesulfonate) within layered double hydroxides," *J. Mater. Chem., 6,* 103–107 (1996).

Messersmith et al., "Syntheses and Barrier Properties of Poly (ε–Caprolactone)–Layered Silicate Nanocomposites," *J. of Polym. Sci., 33,* 1047–1057 (1995).

Pinnavaia et al., "Clay–Reinforced Epoxy Nanocomposites,"*Chem. Mater., 6,* 2216–2219 (1994).

Sugahara et al., "Clay–Organic Nano–Composite; Preparation of a Kaolinite—Poly(vinylpyrrolidone) intercalation Compound," *J. Ceramic Society of Japan, 100,* 413–416 (1992).

Yanno et al., "Synthesis and properties of polyimide–clay hybrid," *ACS, Polymer Preprints, 32,* 65–66, (1991).

Fukushima et al., "Swelling Behavior of Montmorillonite by Poly–6–Amide," *Clay Minerals, 23,* 27–34 (1988).

Verbicky, *Encyclopedia of Polymer Science and Engineering,* 2nd Edition, *12,* 364–383 (1988).

Fukushima et al., "Synthesis of an Intercalated Compound of Montmorillonite and 6–Polyamide," *J. Inclusion Phenomena, 5,* 473–482, (1987).

Okada et al., "Synthesis and Characterization of a Nylon 6–Clay Hybrid," *ACS, Polymer Preprints, 28,* 447–448, (1987).

Fahn et al., "Reaction Products of Organic Dye Molecules with Acid–Treated Montmorillonite," *Clay Minerals, 18,* 447–458 (1983).

Greenland, "Adsorption of Polyvinyl Alcohols by Montmorillonite," *J. Colloid Sci., 18,* 647–664 (1963).

PLATELET PARTICLE POLYMER COMPOSITE WITH OXYGEN SCAVENGING ORGANIC CATIONS

CROSS REFERENCES TO RELATED APPLICATIONS

This application claims the benefit of U.S. Provisional Application Ser. No. 60/148,156 filed Aug. 10, 1999.

FIELD OF THE INVENTION

This invention relates to oxygen scavenging systems comprising platelet particles having oxygen-scavenging organic cations attached thereto and at least one catalyst to promote the oxygen scavenging. This invention further relates to nanocomposites comprising polymers having the oxygen scavenging systems of the present invention dispersed therein and processes for preparing said nanocomposites.

BACKGROUND OF THE INVENTION

There are many products, particularly foods and beverages, which are sensitive to oxygen and suffer significant deterioration upon exposure to very low levels of oxygen. To extend the lifetime of oxygen sensitive products such as beer and fruit drinks there are many commercial containers that incorporate oxygen barriers (passive barrier) and/or oxygen absorbers (active barrier). In these designs, an oxygen barrier is used to effectively reduce the permeation of oxygen into the package. For extremely sensitive products an oxygen absorber is used to chemically react with oxygen permeating into the package or oxygen trapped in the headspace during filling. Through careful design, the use of oxygen barrier and/or scavenger materials results in the creation and maintenance of extremely low oxygen levels within the container.

Some of these oxygen sensitive products also require a packaging material that provides a high physical barrier to other gases, such as carbon dioxide for example. An example of such a product is beer, which requires a packaging material that provides a high barrier against egress of carbon dioxide as well as ingress of oxygen.

For many products that require a barrier against oxygen in addition to a barrier against diffusion of another gas, a physical barrier material of a thickness providing an adequate barrier against the gas other than oxygen often does not provide a sufficient barrier against ingress of oxygen.

A polymeric material that is commonly used in packaging applications is polyethylene terephthalate or PET. This material has a number of valuable properties for packaging but lacks sufficient gas barrier for some applications. For example, although PET has adequate oxygen barrier properties for oxygen-insensitive products such as carbonated soft drinks, its oxygen permeability limits its use in packaging for beer, fruit juices and other citrus products, tomato based products and aseptically packed meat. Similarly, while PET provides a sufficient barrier to carbon dioxide for some applications, such as carbonated soft drinks, it does not provide an adequate barrier against carbon dioxide for other applications, such as beer for example.

To improve PET's gas barrier deficiencies, the concept of a multilayer structure has been taught. Here, polymers that have excellent gas barrier and/or oxygen scavenging properties are combined with PET to produce a layered structure consisting of the individual polymers. Suitable methods for producing multilayer structures include co-injection, co-extrusion, lamination, and coating. Typical polymers suitable as gas barriers include EVOH, PVOH, PVDC and polyamides such as MXD6. Suitable oxygen scavengers include polymers capable of undergoing metal catalyzed oxidation such as MXD6 or polybutadiene, oxidizable metals such as iron, or reduced anthraquinones. Blends of barrier polymers with PET have also been taught as a method to improve the oxygen barrier of packages. Some examples of polymers that have been blended with PET are PEN, EVOH, MXD6, liquid crystal polymers, and BO10. Oxygen absorbers that have been blended into PET include MXD6 with a cobalt catalyst as well as modified polybutadienes incorporated through a reactive extruder.

The formation of a multilayer structures allows the properties of the individual layers to perform independently which allows for optimization of the overall structure. For example, PET can be used to make up the bulk of a container as both the inner and outer layers, while a thin middle layer could consist of EVOH in a three layer bottle. This is advantageous since EVOH, like other barrier or scavenger polymers, is more expensive than PET. Hence, the cost of the structure is minimized by optimizing the amount of barrier or scavenger material needed in the container structure for the application. The ability to form multilayer containers also allows the use of scavenging polymers that by themselves would be precluded due to by-products formed as a result of the scavenging mechanism. By putting a layer of food contact approved polymer, such as PET, between the food and the oxygen-scavenging layer, the migration of by-products into the food is avoided or minimized to acceptable levels.

Although multilayer containers may be less expensive and sturdier than a monolayer container of the barrier or scavenging material itself, the use of different polymers in the layers can result in some problems. For example, the layers sometimes delaminate from each other during use producing a container with diminished structural integrity, barrier properties and clarity. In addition, the use of different polymers in the layers, such as a polyester/polyamide or polyester/polyolefin, increases the difficulty of recycling the material, therefore creating an environmental problem.

The addition of platelet particles, derived from certain clays, to polymers to improve the physical barrier properties of a polymer has also been taught. These so-called nanocomposites are formed by dispersing the platelet particles in the matrix polymer. To effectively improve the gas barrier properties as well as to produce an adequate level of clarity in the polymer, the platelet particles must be partially or fully exfoliated. To achieve this exfoliation, tether molecules are contacted onto the clay. The use of a variety of possible tether molecules has been taught. The tethers are generally organic cations, such as quaternary ammonium salts, phosphonium salts and sulfonium salts. These nanocomposite materials can be used in a monolayer package or in one or more layers of a multilayer structure.

Examples of scavengers incorporated into polyesters are known. For example, WO 98/12127 and WO 98/12244 disclose the preparation of blends of PET containing either oxidizable metals or modified polybutadienes. However, these materials have no passive barrier and are hazy. Also, blends of polyamides with PET are known to be effective scavengers of oxygen in the presence of a cobalt catalyst. However, these blends introduce undesirable contaminants into existing PET recycle streams.

U.S. Pat. No. 5,2736,616 discloses and claims oxygen scavengers containing certain pendant ether moieties.

Thus, there are several oxygen barrier and scavenging technologies known in the art, but none address all the needs for an optimum package.

BRIEF SUMMARY OF THE INVENTION

The present invention relates to novel oxygen scavenging compositions comprising platelet particles having attached thereto at least one tether molecule which scavenges oxygen in the presence of at least one oxygen scavenging catalyst. The present invention further relates to nanocomposites comprising at least one matrix polymer and an oxygen scavenging composition of the present invention dispersed therein.

When the nanocomposites of the present invention are incorporated into a layer of a rigid container or flexible film, the resulting novel articles are suitable for packaging oxygen-sensitive products. The articles containing the composition limit oxygen exposure by acting as an active oxygen barrier and/or a means for scavenging oxygen from within the article.

DETAILED DESCRIPTION

Thus, the present invention provides compositions that effectively scavenge oxygen while also providing a passive barrier to other permeating molecules.

Specifically the composition of the present invention comprises:

a) platelet particles capable of at least partial exfoliated in a matrix polymer b) one or more organic cations capable of attaching themselves to the platelet particle material and scavenging oxygen c) optionally, one or more additional organic cations capable of attaching themselves to the platelet material and improving the level of exfoliation in the matrix polymer, d) catalyst to promote the oxygen scavenging capability of the tether molecules.

The present invention also provides a partially or fully exfoliated polymer-platelet particle nanocomposite derived from a) a matrix polymer;

b) platelet particles capable of at least partial exfoliated in a matrix polymer;

c) one or more organic cations capable of attaching themselves to the platelet particle material and scavenging oxygen;

d) optionally, one or more additional organic cations capable of attaching themselves to the platelet material and improving the level of exfoliation in the matrix polymer;

e) catalyst to promote the oxygen scavenging capability of the tether molecules.

When the nanocomposite is incorporated into a monolayer rigid container or monolayer flexible film or one or more of the layers of a multilayer rigid container or flexible film, then novel articles are prepared for packaging materials that are sensitive to oxygen entering through the container or film and/or require a barrier to permeation of gases or volatile compounds.

Nanocomposites of the present invention can be used as layers in rigid containers, flexible film, thermoformed, foamed, shaped, extruded articles and the like for packaging oxygen-sensitive products or use in oxygen sensitive environments. The nanocomposite layers may in the form of coatings, tie layers co-layers and the like. The articles containing the nanocomposites limit oxygen exposure by acting as an active oxygen barrier and/or a means for scavenging oxygen from within the article.

Suitable articles include, but are not limited to, film, sheet, tubing, profiles, pipes, fiber, blow molded articles such as rigid containers and preforms, thermoformed articles, flexible bags and the like and combinations thereof Typical rigid or semi-rigid articles can be formed from plastic, paper or cardboard cartons or bottles such as juice containers, soft drink containers, beer containers, soup containers, milk containers, thermoformed trays or cups. In addition, the walls of such articles often comprise multiple layers of materials. This invention can be used in one, some or all of those layers.

The process of manufacturing the polymeric composite materials of this invention comprise (1) preparing an intercalated layered platelet particle material and (2) incorporating the intercalated layered material in a polymer. Incorporation may be by polymerization of monomers in the polymer in the presence of the intercalated layered platelet particles followed by any processing such as solid-stating if necessary to obtain the desired molecular weight. Incorporation may also be obtained by melt-processing the polymer with the intercalated layered platelet particle material.

The first step in the preparation of the intercalated layered platelet particle material of the present invention is the reaction of a swellable layered platelet material with an organic cation salt. The cation salt of the present invention serves the dual purpose of aiding the exfoliation of the platelet-particles in the polymeric matrix and imparting an oxygen scavenging capability to the composite material in the presence of an oxidation catalyst. It is understood that one or more than one organic salt may be used and that each organic salt need not necessarily serve both purposes. For example, two distinct organic salts may be used, of which one would predominantly impart the exfoliation properties while the second would predominantly serve to impart the oxygen scavenging capability. In addition, some of the organic salts may serve the purpose of binding the oxidation catalyst near the platelet particles.

The swellable layered platelet particle material is often a silicate material that is a free flowing powder having a cation exchange capacity of between about 0.3 and about 3.0 milliequivalents per gram of mineral. The platelet material may have a wide variety of exchangeable cations present in the galleries between the layers of the silicate material, including, but not limited to cations comprising the alkaline metals (group IA), the alkaline earth metals (group IIA) and their mixtures. The most preferred cation is sodium, however, any cation or combination of cations may be used, provided that most of the cations are exchanged for onium ions in the process of this invention. Preferably, the individual layers of the platelet particles should have a thickness of less than about 2 nm and a diameter in the range of about 10 to about 1000 nm. Useful swellable layered silicate materials included natural, synthetic, and modified phyllosilicates. Illustrative of such silicates are smectite clays, such as montmorillonite, saponite, hectorite, mica, vermiculite bentonite, nontronite, beidellite, volkonskoite, sauconite, magadiite, kenyaite, and the like, synthetic silicates, such as synthetic mica, synthetic saponite, and synthetic hectorite, and modified silicates, such as fluoronated montmorillonite. Other platelet or layered type materials, such as chalcogens may also be used. Suitable silicate materials are available from various companies including Southern Clay Products in Gonzalez, Tex. and Nanocor, Inc. in Arlington Heights, Ill. Generally, the silicate materials are an agglomeration of platelet particles, called tactoids, which are closely stacked together like cards.

Numerous methods to modify layered particles with organic cations are known, and any of these may be used in the process of this invention.

Modified layered platelet particles with one or more organic cations, at least one of which can scavenge oxygen, may be prepared, for example, by the processes of dispersing the platelet particles in water, adding the organic cation salt or organic cation salts (neat or dissolved in water or alcohol) with agitation, then blending for a period of time sufficient for the organic cations to exchange most of the metal cations in the gallaries between the layers of the clay material. Then, the organically modified layered particle material is isolated by methods know in the art including, but not limited to, filtration, centriftigation, spray drying, and their combinations. It is desirable to use a sufficient amount of the organic salt to permit the exchange of most of the metal cations in the galleries of the layered particles for organic cations. The particle size of the resulting organoclay is reduced in size by methods known in the art, including, but not limited to, grinding, pulverizing, hammer milling, jet milling, and their combinations. It is preferred that the average particle size be reduced to less than 100 microns in diameter.

Useful organic cation salts for the purposes of this invention are capable of hydrogen bonding with the selected matrix polymer, binding free oxygen and can be represented as follows:

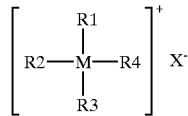

Wherein M represents nitrogen, phosphorous or less preferably, sulfur, $X^-$ represents an anion, usually selected from the group of halogen, hydroxide, or acetate anions. $R_1$, $R_2$, $R_3$, and $R_4$ are independently selected from organic or oligomeric organic moieties. In the case of M being sulfur, one of $R_1$, $R_2$, $R_3$ and $R_4$ represents a lone pair of electrons. Some, but not all, of the R groups may be hydrogen. Of $R_1$, $R_2$, $R_3$, and $R_4$ at least one should be an organic moiety capable of scavenging oxygen. Oxygen scavenging moieties may be any organic moiety containing an easily abstractable hydrogen atom or one or more olefinic unsaturations. Examples of suitable oxygen scavenging moieties are benzylic, allylic, ether, poly (alkylene glycol), molecules with tertiary hydrogens, poly olefins with some level of remaining unsaturation, amines, amides, poly(amines), poly (amides) and any other molecules containing a C–H linkage with a homolytic bond strength of less than or equal to about 93 kcal/mol. Specific examples of such R groups include benzyl, allyl, poly(ethylene glycol), poly(propylene glycol), poly(tetramethylene glycol), poly(pentamethylene glycol), poly(hexamethylene glycol), poly(heptamethylene glycol) and poly(octamethylene glycol), polystyrene, poly (propylene) and poly(butadiene). Individual R groups may also contain more than one different alkylene repeat unit as part of the poly(alkylene glycol) chain in random or non-random order. The poly (alkylene glycol) units may be linear or branched. The number of alkylene glycol units in the poly(alkylene glycol) may range from only two to very large numbers, but in general may be in the range of 2 to about 20.

Similarly, the number of repeat units in other polymeric R groups, such as polystyrene, poly(propylene), poly (butadiene) and the like, may range from single digit to very large numbers and preferably from about 2 to about 20. Additional examples of useful cation salts with poly (alkylene oxide) groups can be derived from poly(ethylene oxide) amines and poly(propylene oxide) amines which are marketed as Jeffamines by Huntsman Corporation. To be useful these amines could be converted to their conjugate acid salt, such as a Jeffamine hydrochloride, or be quaternized by standard alkylation techniques, such as reaction with alkyl halides, dimethyl sulfate, and the like.

In addition to poly(alkylene glycols), cyclic polyethers or oligomers can be used as the oxidizable component of the R group. For example, poly(2,3-dihydrofurandiyl), prepared by cationic polymerization of 2,3-dihydrofuran, could be incorporated into an oxygen scavenging R group in the same fashion as the above-mentioned poly(alkylene glycol)s. Additional examples include polymers derived from monomers of structure I or II, where n+m can be an integer between 3 and 10, and $R'_1$, $R'_2$, $R'_3$, $R'_4$, $R'_5$, and $R'_6$ are independently, a hydrogen atom or a lower alkyl group of 1 to 4 carbons or halogen:

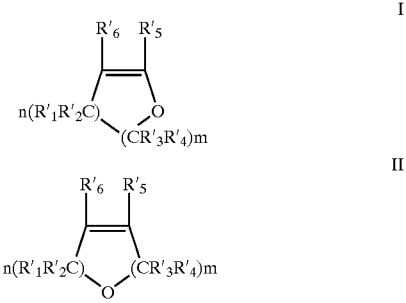

The lower alkyl represented by $R'_1$, $R'_2$, $R'_3$, $R'_4$, $R'_5$, and $R'_6$, in the monomer units I and II, may be the same or different, and are independently selected from the group consisting of alkyls having 1–4 carbon atoms, for example, methyl, ethyl, propyl, isopropyl, butyl, or the like.

It should be noted that oxidizable polymers consisting of the cyclic ether moiety will degrade without polymer chain scission and formation of low molecular weight components that can migrate though the polymer matrix and into the package contents.

Other possible organic cations may have a structures in which two of the R substituents on the M atom are covalently bonded to each other to form a cyclic structure. Such structures may be advantageous for oxygen scavenging, since oxidative cleavage of a bond in the backbone of such a ring would result in fragments that are still attached to the platelet material. In this way the possibility of forming low molecular weight extractable species as a result of the oxidation process is reduced. In more complex structures, more than two of the R groups may be covalently bonded to form multiple ring structures.

In still other structures, one or more of the R groups may be simultaneously bonded to more than one M atom. An example of one such structure might be represented by

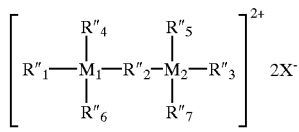

Wherein M1, M2 represent nitrogen or phosphorous or, less preferably, sulfur, R"1, R"3, R"4, R"5, R"6 and R"7 are selected from the same group as R1, R2, R3, and R4, and may or may not serve an oxygen scavenging role. In the case of M1 and/or M2 being sulfur, one of R"1, R"3, R"4, R"5, R"6 and R"7 per sulfur atom represents a pair of electrons. The linking group R"2 would be selected from molecules like those of R1, R2, R3, and R4, but would differ from them in that it is bonded to M1 and M2. It will be understood, that other structures with more than one linking group between the nitrogen, phosphorous or sulfur centers are also possible. Additional structures might involve more than two nitrogen, phosphorous or sulfur atoms linked into the same molecule. An example of such a structure may be derived from calixarenes, which have the general structure

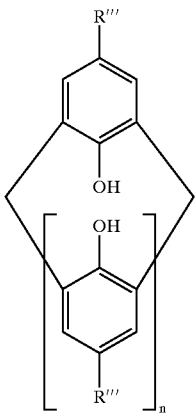

where n is a number between 3 and about 9. These calixarenes may be modified by attaching various groups at some position on the phenyl rings, at the oxygen of the phenolic OH or the R'". One, some or all of these groups would in turn be attached to ammonium, phosphonium or sulfonium centers. In such a way, a calixarene attached to a platelet particle by one or more ammonium, phosphonium or sulfonium centers would be created. The links in the backbone of the calixarene ring contain benizylic hydrogens and may therefore serve as oxygen scavengers. Additionally, the calixarene may be further modified by attaching additional oxygen scavenging groups to it. For all such structures, it would in general be advantageous to derivatize at least some of the phenolic OH in some way, such as functionalization into an ether, since phenolic OH's often act as anti-oxidants. However, some level of anti-oxidant activity may be desirable to introduce an induction period, before the oxygen scavenging activity begins. Likewise, the deprotonation of the calixarene could form a molecular structure in which the charge of multivalent cations would be balanced between the clay and calixarene.

Additionally, calixresorcinarenes, molecules similar to calixarenes, but based on substituted resorcinol instead of substituted phenols, may be useful in the same manner as calixarenes.

In addition to the at least one oxygen scavenging substituent R on the atom M, the other R groups of R1, R2, R3 and R4 in the organic cation can be selected from a much broader set of molecules, which may or may not be known to possess an oxygen scavenging ability. Examples of useful organic groups include, but are not limited to, linear or branched alkyl groups having 1 to 22 carbon atoms, aralkyl groups, which are benzyl or substituted benzyl moieties including fused ring moieties having linear chains or branches of 1 to 22 carbon atoms in the alkyl portion of the structure, aryl groups such as phenyl and substituted phenyl including fused ring aromatic substituents, beta and gamma unsaturated groups having six or less carbon atoms, and alkyleneoxide groups having 2 to 6 carbon atoms. Examples of useful oligomeric or polymeric organic groups include, but are not limited to, poly (alkylene oxide), polystyrene, polyacrylate, polycaprolactone, and the like. Additionally, one or more, but not all, of the R substituents may be hydrogen.

Examples of oxygen-scavenging organic cations that may be used as a component of the present invention include, but are not limited to, bis(2-hydroxylethyl) octadecyl methyl ammonium; various alkyl benzyl dimethyl ammonium cations, where alkyl is a linear or branched alkyl group with 3 to about 30 carbon atoms, such as octadecyl benzyl dimethyl ammonium; tallow benzyl dimethyl ammonium; ditallow benzyl methyl ammonium; and the like or mixtures thereof, as well as trioctyl benzyl phosphonium, triethyl vinylbenzyl phosphonium, dibutyl dodecyl allyl phosphonium, and the like and mixtures thereof Illustrated examples of suitable polyalkoxylated ammonium compounds include those available under the trade name Ethoquad or Ethomeen from Akzo Chemie America, namely, Ethoquad 18/25 which is octadecyl methylbis (polyoxyethylene [15]) ammonium chloride and Ethomeen 18/25 which is octadecyl bis(polyoxyethylene [15]) amine, where the brackets refer to the total number of ethylene oxide units.

Examples of organoclays suitable as a component of the present invention are, but are not limited to, Claytone APA and Claytone EM available from Southern Clay Products.

More than one organic cation salt may be used in the process of preparing a nanocomposite material according to the present invention. In such a case, some of the organic cation salts need only have exfoliating capabilities and limited or no oxygen scavenging capabilities. For these exfoliating organic cation salts, all of $R_1$, $R_2$, $R_3$, and $R_4$ can be selected from the broader set of molecules that do not necessarily posses an oxygen scavenging capability. Examples of useful organic groups again include, but are not limited to, linear or branched alkyl groups having 1 to 22 carbon atoms, aralkyl groups, which are benzyl or substituted benzyl moieties including fused ring moieties having linear chains or branches of 1 to 22 carbon atoms in the alkyl portion of the structure, aryl groups such as phenyl and substituted phenyl including fused ring aromatic substituents, beta and gamma unsaturated groups having six or less carbon atoms, and alkyleneoxide groups having 2 to 6 carbon atoms. Examples of useful oligomeric organic groups include, but are not limited to, poly (alkylene oxide), polystyrene, polyacrylate, polycaprolactone, and the like. Preferably the oxygen scavenging organic cations comprise moieties capable of interacting with the selected matrix polymer. For polyamides, hydroxyl and ether moieties provide potential interaction sites with the hydrogens on the polyamide. The interactions allow greater intercalation of the polyamide into the organoclay.

Examples of useful exfoliating organic cations that may be used in conjunction with one or more oxygen-scavenging organic cations include, but are not limited to, alkyl ammonium ions, such as dodecyl ammonium, octadecyl ammonium, bis(2-hydroxylethyl) octadecyl methyl ammonium, octadecyl benzyl dimethyl ammonium, tetramethyl ammonium, and the like or mixtures thereof, and alkyl phosphonium in such as tetrabutyl phosphonium, trioctyl octadecyl phosphonium, tetraoctyl phosphonium, octadecyl triphenyl phosphonium, as well as others well known in the art, such as those disclosed in U.S. Pat. No. 4,136,103, and the like and mixtures thereof Illustrated examples of suitable polyalkoxylated ammonium compounds include those available under the trade name Ethoquad or Ethomeen from Akzo Chemie America, namely, Ethoquad 18/25 which is octadecyl methylbis(polyoxyethylene [15]) ammonium chloride and Ethomeen 18/25 which is octadecyl bis (polyoxyethylene [15]) amine, where the brackets refer to the total number of ethylene oxide units.

The oxygen scavenging organic cation of the present invention may be attached to the platelet particles ionically, covalently or by any other form of chemical attachment, such as by van der Waals forces. Any type of bonding or attraction is suitable so long as they stay bound or associated with the platelet particles throughout processing, incorporation into matrix polymers and use. Specifically, the oxygen scavenging cation may be attached or associated as a separate cation or may be attached or associated with exfoliating organic cation.

Suitable oxidation catalysts, (e), include transition metal catalysts which can readily interconvert between at least two oxidation states. Preferably, the transition metal is in the form of a transition metal salt with the metal selected from the first, second or third transition series of the Periodic Table. Suitable metals include manganese II or III, iron II or III, cobalt II or III, nickel II or III, copper I or II, rhodium II, III or IV and ruthenium. Suitable counterions for the metal include, but are not limited to, chloride, acetate, acetylacetonate, stearate, palmitate, 2-ethylhexanoate, neodecanoate or naphthenate. The metal salt may also be an ionomer, in which case a polymeric counterion is employed. Such ionomers are well known in the art.

The matrix polymer (a) may be present at concentrations of 0 to 99.99 weight % of the total composition. Thermoplastic polymers which are suitable in the present invention include polyesters, polyolefins, polyamides, polyurethanes, polystyrene, polyacrylates, epoxy-amines, polyvinyl chloride, acrylonitrile containing polymers and copolymers, vinylidene chloride containing polymers and copolymers, polycarbonates, and ethylene copolymers such as ethylene-vinyl acetate, ethylene-vinyl alcohol, ethylene-alkyl (meth) acrylates, ethylene-(meth)acrylic acid and ethylene-(meth) acrylic ionomers. Blends of different thermoplastic polymers may also be used.

Suitable polyesters include at least one diacid and at least one glycol. The primary dibasic acids are terephthalic, isophthalic, naphthalenedicarboxylic, 1,4-cyclohexanedicarboxylic acid, phenylenedioxydiacetic acid and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. The various isomers of phenylenedioxydiacetic acid or mixtures of isomers may be used but the 1,2-, 1,3-, and 1,4 - isomers are preferred. In addition to the acid forms, the lower alkyl esters or acid chlorides may also be used.

The dicarboxylic acid component of the polyester may optionally be modified with up to about 95 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, isophthalic acid, naphthalene- 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Polyesters may be prepared from one or more of the above dicarboxylic acids.

Typical glycols used in the polyester include aliphatic glycols containing from two to about ten carbon atoms, and cycloaliphatic glycols containing 7 to 14 carbon atoms. Preferred glycols include ethylene glycol, 1,4-butanediol, 1,6-hexanediol, 1,4-cyclohexanedimethanol, diethylene glycol and the like. The glycol component may optionally be modified with up to about 50 mole percent, preferably up to about 25 mole % and most preferably up to about 15 mole % of one or more different diols. Such additional diols include cycloaliphatic diols preferably having 6 to 20 carbon atoms, aromatic diols containing from 6 to 15 carbon atoms or aliphatic diols preferably having 3 to 20 carbon atoms. Examples of such diols include: diethylene glycol, triethylene glycol, 1,4-cyclohexanedimethanol (when using 1,4-cyclohexanedimethanol, it may be the cis, trans or cis/trans mixtures), propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1, 3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 1,3-bis(2-hydroxyethoxy)benzene, 1,4-bis(2-hydroxyethoxy)benzene, 2,2-bis-(4-hydroxypropoxyphenyl)-propane, resorcinol, hydroquinone and the like. Polyesters may be prepared from one or more of the above diols.

The polyester resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polyesters that may be a component of the present invention can be made by conventional processes well known in the art, and need not be described here.

Suitable polyolefins of the present invention include mono- and diolefins, for example polypropylene, polyisobutylene, polybut-1-ene, poly-4-methylpent-1-ene, polyisoprene, or polybutadiene, and also polymers of cycloolefins, for example of cyclopentene or norbornene, furthermore polyethylene (which can be crosslinked), for example high-density polyethylene (HDPE), high-density polyethylene of high molar mass (HDPE-HMW), high-density polyethylene of ultra high molar mass (HDPE-UHMW), medium-density polyethylene (MDPE), low-density polyethylene (LDPE), linear low-density polyethylene (LLDPE) and branched low-density polyethylene (VLDPE).

Mixtures of the polymers described above, for example mixtures of polypropylene with polyisobutylene, polypropylene and polyethylene (e.g. PP/HDPE, PP|LDPE) and mixtures of different types of polyethylene (e.g. LDPE/HDPE).

Suitable copolymers of monoolefins and diolefins with each other or with other vinyl monomers are disclosed in WO 97/30112 and WO 97/11993.

Suitable polyamides include partially aromatic polyamides, aliphatic polyamides, wholly aromatic polyamides and mixtures thereof By "partially aromatic polyamide" it is meant that the amide linkage of the partially aromatic polyamide contains at least one aromatic ring and a nonaromatic species.

Wholly aromatic polyamides comprise in the molecule chain at least 70 mole % of structural units derived from m-xylylene diamine or a xylylene diamine mixture comprising m-xylylene diamine and up to 30% of p-xylylene diamine and an α∈-aliphatic dicarboxylic acid having 6 to 10 carbon atoms, which are further described in Japanese Patent Publications No., 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- or para-xylylene diamine, 1,3- or 1,4-20 cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include: poly(m-xylylene adipamide), poly(hexamethylene isophthalamide), poly(hexamethylene adipamide-co-isophthalamide), poly (hexamethyl adipamide-co-terephthalamide) and poly (hexamethylene isophthalamide-co-terephthalamide). The most preferred partially aromatic polyamide is poly(m-xylylene adipamide).

Preferred aliphatic polyamides include poly (hexamethylene adipamide) and poly(caprolactam). The most preferred aliphatic polyamide is poly(hexamethylene adipamide). Partially aromatic polyamides, are preferred over the aliphatic polyamides where good thermal properties are crucial.

Preferred aliphatic polyamides include polycapramide (nylon 6), poly-aminoheptanoic acid (nylon 7), poly-aminonanoic acid (nylon 9), polyundecane-amide (nylon 11), polylaurylactam (nylon 12), polyethylene-adipamide (nylon 2,6), polytetramethylene-adipamide (nylon 4,6), polyhexamethylene-adipamide (nylon 6,6) polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

The polyamides of the present invention can be made by conventional processes well known in the art, and need not be described here.

The composition of this invention can initiate oxygen scavenging in a composition, layer, or packaging article solely prepared from an oxygen scavenging organic cation attached to a platelet material in a polymeric matrix and transition metal catalyst. However, components such as photoinitiators or antioxidants can be added to further facilitate or control the initiation of the oxygen scavenging properties.

For instance, it may be advantageous to add a photoinitiator, or a blend of different photoinitiators, to the oxygen scavenging compositions, if any antioxidants are included to prevent premature oxidation of that composition.

Suitable photoinitiators are well known to those skilled in the art. Specific examples include, but are not limited to, benzophenone, o-methoxybenzophenone, acetophenone, o-methoxy-acetophenone, acetonaphthenquinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one,xanthene-9-one,7H-benz[de]anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, (α,α-dibutoxyacetophenone, etc. Singlet oxygen generating photosensitizers such as Rose Bengal, methylene blue, tetraphenyl porphyrin, and zinc phthalocyanine may also be employed as photoinitiators as well. Polymeric photoinitiators include poly(ethylene carbon monoxide), and oligo[2-hydroxy-2-methyl-1-[4-(1-methylvinyl)phenyl]propanone]. Use of a photoinitiator is preferable because it generally provides faster and more efficient initiation. When actinic radiation is used, the initiators may also provide initiation at longer wavelengths that are less costly to generate and are less harmful.

As mentioned above, antioxidants may be used with this invention to control scavenging initiation. An antioxidant as defined herein is any material that inhibits oxidative degradation or cross-linking of polymers. Typically, such antioxidants are added to facilitate the processing of the polymeric materials and/or prolong their useful lifetime. In relation to this invention, such additives prolong the induction period for oxygen scavenging in the absence of irradiation. Then when the layer's or article's scavenging properties are required, the layer or article (and any incorporated photoinitiator) can be exposed to radiation.

Antioxidants such as 2,6-di-(t-butyl)-4-methylphenol (BHT); 2,2'-methylene-bis(6-t-butyl-p-cresol); triphenylphosphite; tris-(nonylphenyl)phosphite; dilaurylthiodipropionate and pentaerythritol tetrakis(3,5-di-tert-butyl-4-hydroxyhydrocinnamate) (Irganox 101 from Ciba) would be suitable, but not limited to, for use with this invention.

The invention has been described in detail with particular reference to preferred embodiments thereof, but it will be understood that variations and modifications can be effected within the spirit and scope of the invention.

We claim:

1. A composition comprising a) platelet particles having attached thereto at least one oxygen scavenging organic cation and at least one intercalating organic cation; and b) at least one oxidation catalyst wherein said composition is dispersed in at least one matrix polymer.

2. The composition of claim 1 wherein said oxidation catalyst comprises a transition metal salt wherein said transition metal is selected from the first, second or third transition series of the Periodic Table.

3. The composition of claim 1 wherein said oxidation catalyst is selected from the group consisting of manganese II or III, iron II or III, cobalt II or III, nickel II or III, copper I or II, rhodium II, III or IV and ruthenium.

4. The composition of claim 2 wherein said transition metal salt comprises at least one counterion for the metal selected from the group consisting of chloride, acetate, acetylacetonate, stearate, palmitate, 2-ethylhexanoate, neodecanoate, naphthylate and mixtures thereof.

5. The composition of claim 2 wherein said transition metal salt comprises an ionomer and said oxidation catalyst further comprises a polymeric counterion.

6. The composition of claim 1 wherein said matrix polymer is a thermoplastic polymer present in amounts up to about 99.9 weight percent of said total composition.

7. The composition of claim 6 wherein said thermoplastic polymer is selected from the group consisting of polyesters, polyolefins, polyamides, polyurethanes, polystyrene, polyacrylates, epoxy-amines, polyvinyl chloride, acrylonitrile polymers, acrylonitrile copolymers, vinylidene chloride polymers, vinylidene chloride copolymers, polycarbonates, ethylene copolymers, and mixtures thereof.

8. The composition of claim 6 wherein said thermoplastic polymer is selected from the group consisting of polyesters, polyamides, polyolefins, polycarbonates, EVOH, and mixtures thereof.

9. The composition of claim 1 wherein said oxygen scavenging organic cation is capable of hydrogen bonding with said matrix polymer, binding free oxygen and represented as:

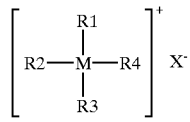

wherein M represents nitrogen, phosphorous or sulfur, X$^-$ represents an anion, selected from the group consisting of halogen, hydroxide, or acetate anions; and $R_1$, $R_2$, $R_3$, and $R_4$ are independently selected from organic or oligomeric organic moieties and hydrogen and at least one of $R_1$, $R_2$, $R_3$ or $R_4$ comprises an organic moiety containing an easily abstractable hydrogen atom or one or more olefinic unsaturations.

10. The composition of claim 9 wherein M is sulfur and one of $R_1$, $R_2$, $R_3$ and $R_4$ represents a lone pair of electrons.

11. The composition of claim 10 wherein said organic moiety is selected from the group consisting of benzylic, allylic, ether, poly (alkylene glycol), molecules with tertiary hydrogens, polyolefins with some level of remaining unsaturation, amines, amides, poly(amines), and poly(amides).

12. The composition of claim 10 wherein said organic moiety is selected from the group consisting of benzyl, allyl, poly(ethylene glycol), poly(propylene glycol), poly(tetramethylene glycol), poly(pentamethylene glycol), poly(hexamethylene glycol), poly(heptamethylene glycol), poly(octamethylene glycol), polystyrene, poly(propylene), and poly(butadiene).

13. An article comprising at least one layer comprising a matrix polymer having dispersed therein a) platelet particles having attached thereto at least one oxygen scavenging organic cation and at least one intercalating organic cation; and b) at least one oxygen scavenging catalyst.

14. The article of claim 13 wherein said article is selected from the group consisting of film, sheet, tubing, profiles, pipes, fiber, containers, preforms, thermoformed articles and flexible bags.

15. The article of claim 13 wherein said article is selected from the group consisting of film, sheet, tubing, profiles, pipes, containers and preforms.

16. The article of claim 13 wherein said article is a container or a preform comprising at least three layers in at least a portion of said article.

17. The article of claim 13 wherein an intermediate layer comprises said polymer composite and is disposed between a first and third layer each of which comprises at least one polyester.

18. The article of claim 13 wherein said article is a container or a preform comprising at least four layers in at least a portion of said article.

19. The article of claim 18 wherein said polymer composite is disposed in an intermediate layer between a first and fourth layer each of which comprises at least one polyester.

20. The article of claim 19 wherein at least one layer comprises recycled polyester.

21. The composition of claim 1 wherein said matrix polymer comprises recycled polymer.

22. The composition of claim 21 wherein said recycled polymer is selected from the group consisting of polyesters, polyolefins, polyamides, polyurethanes, polystyrene, polyacrylates, epoxy-amines, polyvinyl chloride, acrylonitrile polymers, acrylonitrile copolymers, vinylidene chloride polymers, vinylidene chloride copolymers, polycarbonates, ethylene copolymers, and mixtures thereof.

* * * * *

UNITED STATES PATENT AND TRADEMARK OFFICE
CERTIFICATE OF CORRECTION

PATENT NO. : 6,610,772 B1
DATED : August 26, 2003
INVENTOR(S) : Clauberg et al.

It is certified that error appears in the above-identified patent and that said Letters Patent is hereby corrected as shown below:

<u>Column 13,</u>
Line 11, reads "about 99.9 weight percent of said total composition." but should read -- 99.9 weight percent of said total composition. --

Signed and Sealed this

Ninth Day of December, 2003

JAMES E. ROGAN
*Director of the United States Patent and Trademark Office*